United States Patent [19]
Itoh et al.

[11] 3,939,650
[45] Feb. 24, 1976

[54] OPERATIONAL CIRCUITRY FOR USE IN A GAS TURBINE ENGINE CONTROL SYSTEM

[75] Inventors: Takane Itoh, Yokohama; Takao Kamide, Zushi, both of Japan

[73] Assignee: Nissan Motor Co., Ltd., Yokohama, Japan

[22] Filed: Nov. 26, 1974

[21] Appl. No.: 527,372

[30] Foreign Application Priority Data
Nov. 28, 1973 Japan.............................. 48-132560

[52] U.S. Cl............................................. 60/39.28 T
[51] Int. Cl.$^2$.......................................... F02C 9/08
[58] Field of Search ................. 60/39.28 T, 39.28 R

[56] References Cited
UNITED STATES PATENTS

| | | | |
|---|---|---|---|
| 3,648,033 | 3/1972 | Bader | 60/39.28 T |
| 3,739,250 | 6/1973 | Beadman | 60/39.28 T |
| 3,747,340 | 7/1973 | Fenton | 60/39.28 T |
| 3,832,893 | 9/1974 | Dlugos | 60/39.28 T |
| 3,834,158 | 9/1974 | Oppmann | 60/39.28 R |
| 3,851,464 | 12/1974 | Davis | 60/39.28 T |

*Primary Examiner*—Clarence R. Gordon

[57] ABSTRACT

A mathematical expression is converted and approximations applied to simplify same and thus circuitry which modifies an electrical signal representing a gas temperature into another one.

1 Claim, 3 Drawing Figures

OPERATIONAL CIRCUITRY FOR USE IN A GAS TURBINE ENGINE CONTROL SYSTEM

This invention relates generally to a gas turbine engine control system, and particularly to an operational circuitry for use in a gas turbine engine control system. The operational circuitry modifies an electrical signal into another one in accordance with an actual engine ambient temperature. The electrical signal to be modified represents an optimum gas temperature at the inlet of a compressor turbine under the condition of a standard average engine ambient temperature.

Figure 1:
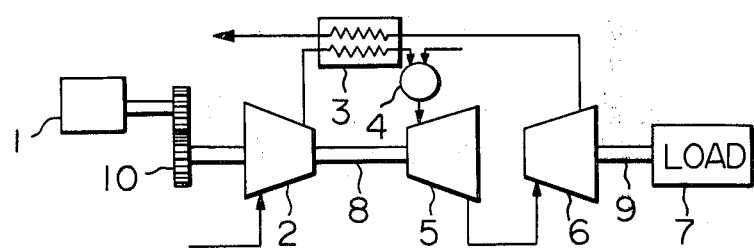

Before discussing in detail the present invention, reference is made to FIG. 1 wherein a typical gas turbine engine is depicted schematically. An engine starter 1 drives a compressor 2 and a compressor turbine 5 through gearing 10 and a compressor rotor shaft 8, whereby they are set into rotation and fuel is supplied to the engine upon starting. The starter 1 is thereafter de-energized. Ambient air enters the engine and is delivered to the compressor 2. Compressed air existing from the compressor 2 passes through a heat exchanger or a regenerator 3 where it is preheated through heat exchange with engine exhaust gases. The preheated air from the regenerator 3 is delivered to a combustion chamber 4 wherein it supports combustion of fuel. The hot combustion products from the combustion chamber 4 expand through the compressor turbine 5 thereby driving the turbine 5 and, via the compressor rotor shaft 8 also the compressor 2. The gases generated by the combustion of fuel in the combustion chamber 4, after passing through the compressor turbine 5, flow through power turbine inlet nozzles (not shown) and thence to a power turbine 6. The gases expanding through the power turbine 6 are delivered to the regenerator 3 for cooling before exhaust and for preheating the compressed air being delivered to the combustion chamber 4. The engine output shaft torque is applied through a power turbine output shaft 9 to a load 7.

This invention is concerned with an electrical operational circuitry for use in a gas turbine engine control system. The operational circuitry is directed to modify an electrical signal into another one in accordance with an actual engine ambient temperature. This electrical signal to be modified represents an optimum gas temperature at the inlet of the turbine 5 under the condition of a standard average engine ambient temperature. The electrical signal representing the optimum gas temperature as mentioned above is previously determined on the basis of various operating parameters of a gas turbine engine such as compressor shaft 8 speed, input-outputs ratios of the compressor 2, etc. However, the determination of the signal representing the optimum gas temperature does not concern the present invention. In this specification, it is assumed that the signal indicative of the optimum gas temperature has been already determined by other suitable system. Therefore, the subject matter of the present invention resides in an improved circuitry to modify the signal representing the optimum gas temperature at the turbine 5 inlet into another signal in accordance with the actual engine ambient temperature.

The requirement of signal modification as will be stated in this specification arises from the following demand. That is, in order to change the actual gas temperature at the turbine 5 inlet to the optimum one in an engine control operation, the signals representing the above respective temperatures should be at first hand compared to find the difference therebetween.

In order to perform the above mentioned signal comparison, however, other method can be presented besides that of the present invention: that is, the signal representing the actual operating gas temperature is modified into another one such that the latter, namely, the modified signal represents a gas temperature at a standard average engine ambient temperature. Consequently, the signal representing the optimum gas temperature at the turbine 5 inlet can be compared with the above mentioned modified signal because they both are in the same class regarding the fact that they both represent gas temperatures at the standard average engine ambient temperature. In order to realize the above mentioned method, Eq.(1) shown below is employed.

$$T_2^* = T_2 \times \frac{T_{sd}}{T_1} (°K) \qquad (1)$$

where $T_2$: signal representing the actual gas temperature at the turbine 5 inlet in degrees absolute, $T_2^*$: signal modified by $T_{sd}$ and $T_1$, $T_{sd}$: signal representing standard average engine ambient temperature in degrees absolute, $T_1$: signal representing actual ambient temperature in degrees absolute.

On the other hand, the signal modification according to the present invention is performed by the following equation.

$$T_{2s} = T_{2s}^* \times \frac{T_1}{T_{sd}} \qquad (2)$$

where $T_{2s}^*$: signal representing the optimum gas temperature at the turbine 5 inlet under the condition of standard average engine ambient temperature in degrees absolute, $T_{2s}$: signal modified by $T_{sd}$ and $T_1$.

Regarding the above two signal modifying steps, the former is not generally applicable for the reason as discussed below: that is, since the optimum gas temperature should be less than the maximum allowable temperature limit for the materials used in the engine, the maximum allowable temperature also should be converted into an electrical signal and then modified in terms of Eq.(1) to be compared with the signal representing the optimum operating temperature, therefore additional signal modification must be performed thereby making the operational circuitry expensive and complicated in its circuit arrangement.

To avoid this defect, the latter modification, namely, the change of the signal representing the optimum operating temperature to another signal for comparing it with the signal representing the actual gas temperature is preferably performed on the basis of the Eq.(2). However, an operational circuitry according to prior art for solving the Eq.(2) for $T_{2s}$ comprises a multiplier for multiplying parameter $T_{2s}$ by another parameter $T_1$. As a result, the prior art has some defects that due to the multiplier required it is complicated in its circuit arrangement and expensive to obtain accurate result.

Hence, the present invention is directed to provide a simple, economical, and comparatively accurate operational circuitry without such a multiplier. The operation circuitry in accordance with this invention is constructed on the basis of an approximate expression obtained from Eq.(2), which is discussed in detail later.

It is an object of the present invention to provide an improved operational circuitry for use in a gas turbine engine control system, which circuitry modifies an electrical signal representing an optimum gas temperature at a compressor inlet into another one in accordance with an actual engine ambient temperature.

Figure 2:
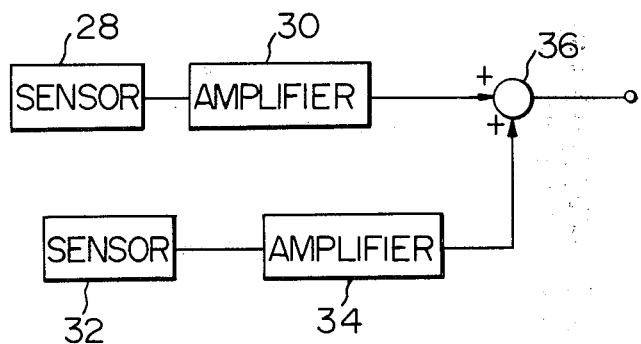
Figure 3:
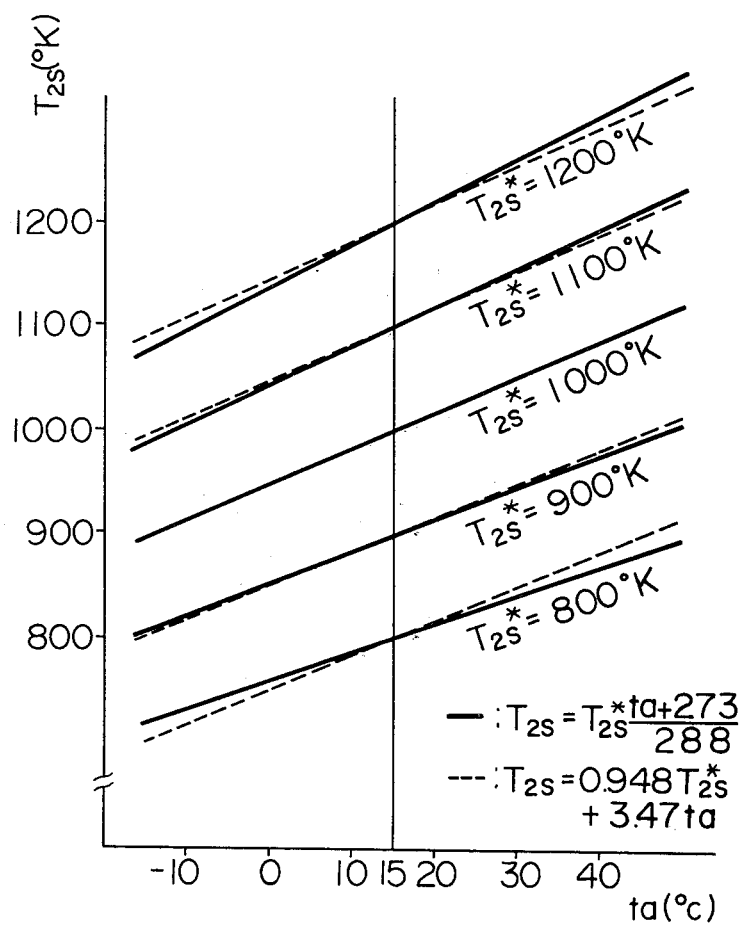

Other objects, features, and advantages of the present invention will become more apparent on reference to the succeeding detailed description thereof, and to the accompanying drawings illustrating the preferred embodiment thereof, wherein:

FIG. 1 illustrates, schematically, a typical gas turbine engine of the type in which the present invention is embodied;

FIG. 2 illustrates, schematically, in a block diagram an operational system embodying the present invention; and FIG. 3 illustrates, graphically the relationship between a signal representing ambient temperature ($t_a$) and a signal representing compressor turbine inlet gas temperature ($T_{2s}$) modified by the former for a signal representing various optimum compressor turbine inlet gas temperatures ($T_{2s}^*$) in order to compare the results of this invention with that of prior art.

The preferred embodiment of the present invention will be hereinafter described in detail. Assuming that the signal $t_a$ represents an ambient temperature or a temperature of the air entering the compressor 2 in Celsius, then a signal $T_1$ representing its absolute temperature is $$T_1 = 273 + t_a \ (°K) \qquad (3)$$

Furthermore, if the standard or average temperature is 15°C, a signal $T_{sd}$ representing its absolute temperature is $$T_{sd} = 273 + 15 = 288 \ (°K) \qquad (4)$$

Placing these signals $T_1$ and $T_{sd}$ in Eq.(2) gives $$T_{2s} = T_{2s}^* \times \frac{273 + t_a}{288} \qquad (5)$$

$$= \frac{273 \times T_{2s}^*}{288} + \frac{T_{2s}^* \times t_a}{288} \qquad$$

$$= 0.948 T_{2s}^* + \frac{T_{2s}^* \times t_a}{288} \ (°K) \qquad (6)$$

In Eq.(6), provided that $T_{2s}^*$ ranges from 800°K to 1200°K, its median value, namely, 1000°K in this case, is replaced by $T_{2s}^*$ in the second term of the right hand thereof, then we obtain $$T_{2s} = 0.948 T_{2s}^* + \frac{1000 \times t_a}{288}$$

-continued
$$= 0.948 T_{2s}^* + 3.47 t_a \qquad (7)$$

FIG. 2 schematically shows in a block diagram an operational circuitry for resolving $T_{2s}$ of Eq.(7) in accordance with the present invention. An amplifier 30 receives an electrical signal representing $T_{2s}^*$ from a suitable sensor 28 and amplifies it by a factor of 0.948. Then, the output of the amplifier 30 is fed to summing means 36. A temperature sensor 32 is mounted, for example, within an air intake portion (not shown) of the compressor 2 and senses a temperature of the air entering the compressor 2 for generating a signal $t_a$ representing the temperature. An amplifier 34 receives the output of the temperature sensor 32 and amplifies it by a factor of 3.47. The summing means 36 is supplied with the output signal of the amplifier 34 and generates an electrical signal representing the sum of $0.948 T_{2s}^*$ and $3.47 t_a$. Thus, $T_{2s}$ of Eq.(7) is derived from the FIG. 2 operational circuitry of the present invention.

FIG. 3 graphically shows the relationship between $T_{2s}$ and $t_a$ for different values of $T_{2s}^*$. Solid lines denote the results obtained by Eq.(5), on the other hand dotted lines the results by Eq.(7). As seen from the graph, deviations of Eq.(7) with respect to these of Eq.(5) is within ±2% over the range $-10 < t_a < 40°C$ of $t_a$. Our experiment proves that the deviations are empirically negligible.

As is understood from the above description, the control circuitry in accordance with the present invention has advantages that it is simple in its arrangement and comparatively accurate compared with the conventional operational system constructed on the basis of Eq.(5).

What is claimed is:
1. An operational electronic circuitry for use in a gas turbine engine control system for modifying a first signal into a second signal with respect to an actual ambient temperature, said first signal representing an optimum gas temperature at an inlet of a compressor turbine under a condition of a standard average engine ambient temperature, comprising:
   first means for receiving said first signal to amplify it by a factor of $273/T_{sd}$ and to generate a signal according to the amplification, where $T_{sd}$ is a standard average ambient temperature in degrees absolute;
   second means for sensing said actual ambient temperature to generate a signal representing it in degrees absolute;
   third means for receiving said signal from said second means to amplify it by a factor of $T_{2sm}/T_{sd}$ and to generate a signal in proportion thereto, where $T_{2sm}$ is a median of values of said first signal; and
   fourth means for summing said signals from said first and third means to develop said second signal.

* * * * *